Figure 1:
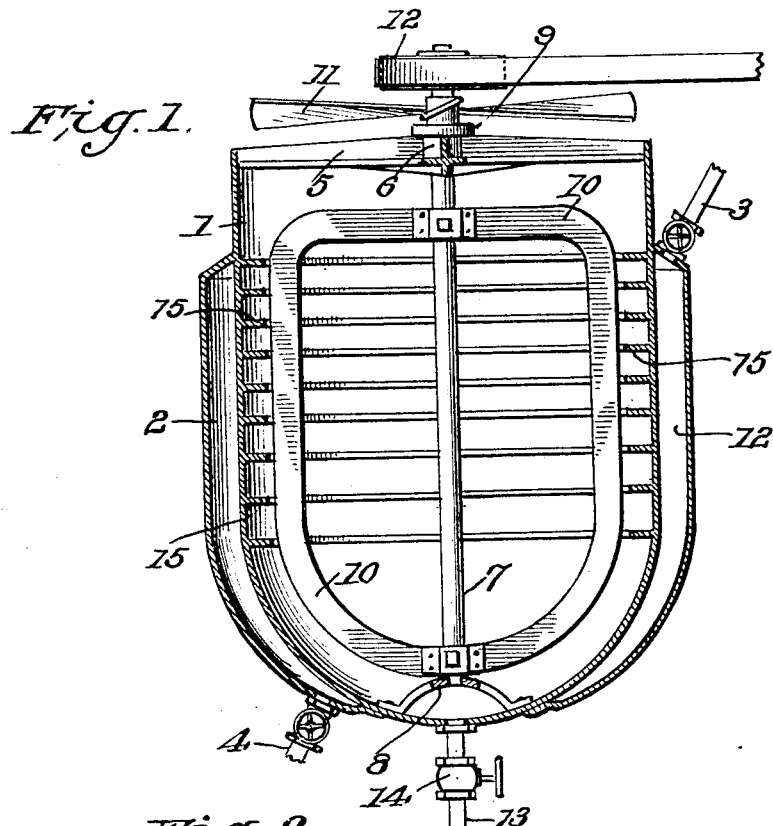

C. R. MABEE.
DEVICE FOR THE EVAPORATION OF LIQUIDS AND IN THE DRYING OF SUBSTANCES.
APPLICATION FILED DEC. 15, 1913. RENEWED MAR. 18, 1920.

1,420,649.

Patented June 27, 1922.

Witnesses
H. P. Martin
C. A. Davis

Inventor
Charles R. Mabee

UNITED STATES PATENT OFFICE.

CHARLES R. MABEE, OF TOLEDO, OHIO.

DEVICE FOR THE EVAPORATION OF LIQUIDS AND IN THE DRYING OF SUBSTANCES.

1,420,649.   Specification of Letters Patent.   Patented June 27, 1922.

Application filed December 15, 1913, Serial No. 806,889. Renewed March 18, 1920. Serial No. 366,962.

*To all whom it may concern:*

Be it known that I, CHARLES R. MABEE, of the city of Toledo, county of Lucas, and State of Ohio, have invented certain new and useful Improvements in Devices for the Evaporation of Liquids and in the Drying of Substances; and I do declare that the following is a full, clear, and exact description of the same.

This invention relates to the evaporation of water from solutions and mixtures and to the drying of substances by the combined action of heat and outward pressure upon the solutions, mixtures or substances operated upon against heated surfaces as a result of rotary motion applied thereto, the means for effecting said rotary motion being rigid in character and adjusted to the conformity of the heated surface adjacent to which it is adapted to move as a result of said rotary motion.

To enable others skilled in the art to which it appertains to make and use the same, I will proceed to describe it with reference to the drawing, in which similar reference characters refer to similar parts in all the figures.

Figure 2:
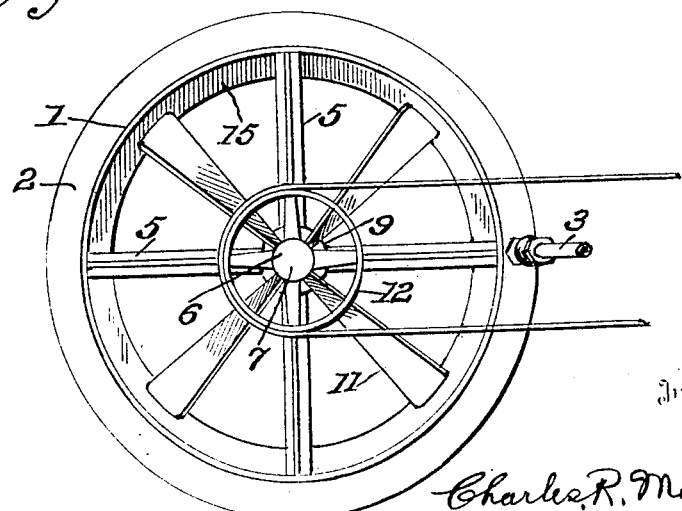

Figure 1 is a vertical section of my improved device, and Figure 2 is a top plan view of the same.

Referring more particularly to the drawings, 1 is the container of the general form of an upright cylinder, open at the top and having a closed bottom of conical or spherical contour, and provided in the convex cylindrical portion with a succession of circular flanges 15, perpendicular to the longitudinal axis of the container, spaced apart from each other.

A steam jacket 2 encloses the container externally and affords means for the application of heat externally thereto and is provided with a steam inlet 3 and an outlet 4 for the removal of the water of condensation. A suitable support 5, attached transversely of the top of the container and having a bearing 6, supports a shaft 7 mounted in the longitudinal axis of the container and is supported at its lower extremity in a bearing 8. A plurality of blades 10, curved to approximately the cross-sectional form of the interior of said container, are rigidly attached to the shaft 7 interiorly of the bearings, a collar 9 is attached to said shaft and bears upon the support 5 and the bearing 6 and assists in supporting the internal moving parts. Fan blades 11 are attached to the shaft above the collar and a pulley 12 above the fan blade. An off-take pipe 13 leads centrally to the base of the container and is provided with a cock 14, furnishing means for the withdrawal of the finished product from the container.

The container being open to the atmosphere, the liquid to be treated may be supplied thereto in any convenient manner.

The operation of my device is as follows:

The liquid or substance to be treated having been introduced within the container, after the proper motion has been imparted to the arms 10, said liquid or substance has communicated to it through the revolution of said arms, a motion circumferentially of the container in the direction of the rotation of the arms, and under the centrifugal impulse thus imparted to it, rises vertically of the cylindrical wall, in the form of a thin layer. The passage of the liquid or substance operated upon, under pressure over and against the heating surfaces hastens evaporation and rapidly reduces the liquid or substance operated upon to the desired form for withdrawal from the container.

The vapors of evaporation are removed from the receiver by the rotary motion of the fan blades 11, which may be revolved in either direction.

In this invention, heat may be applied to the container by direct fire, hot gases, electricity or other suitable means.

While the construction set out is excellently adapted for the employment of my invention in practice, I do not limit myself to the details as they may be modified without departing from the spirit of my invention.

It will be appreciated that by reason of the substantially unobstructed open end provided at the top of the container, a horizontally widely expanded outlet is provided for the copious discharge of vapors from the container, and the rapid escape of these vapors is accelerated by the action of the fan 11, or equivalent means. It will be further noted that the rapidly revolving conveyor means is constructed and arranged whereby to leave an interior vapor zone for the reception of the vapors as they pass from the moving layer of material under treatment, and from the said zone these vapors will readily escape as aforesaid.

Rapid, economical, and efficient evaporation results, and among the materials which may be satisfactorily evaporated or condensed by means of an apparatus of the general character described herein, milk may be mentioned as an example.

I have in other copending applications illustrated and described modified forms of evaporating or condensing apparatus, and novel methods of procedure in the evaporation or condensing of materials, and in this connection reference is made to the following applications:—Serial No. 718,114, filed August 31, 1912; Serial No. 277,904 (a division of 718,114), filed February 18, 1919; Serial No. 738,178, filed December 23, 1912; Serial No. 40,757, filed July 19, 1915; Serial No. 77,996, filed February 12, 1916; 797,087, filed Oct. 23, 1913 (renewed as Serial No. 108,956); Serial No. 805,598, filed December 9, 1913; Serial No. 806,888, filed Dec. 15, 1913 (renewed as Serial No. 358,433); and Serial No. 806,891, filed December 15, 1913 (renewed as Serial No. 280,144); and I reserve the right to claim in my copending applications the novel subjects-matter therein disclosed and not herein claimed.

Having thus fully described my invention, what I claim is—

1. In an open evaporating and drying device, in combination, an upright substantially cylindrical container, means for applying heat to the container externally thereof, rapidly and horizontally rotating internal arms for engaging and positively communicating circumferential motion over the surface of the container to the material under treatment and causing an upward movement of said material, and means adjacent the interior wall of said container for supporting said contents.

2. In an evaporating and drying device, the combination of an externally heated substantially cylindrical container, rapidly and horizontally rotating internal means for communicating motion centrifugally and circumferentially of said container to the contents thereof to cause the upward movement of said contents, and stationary means adjacent to the interior wall of said container for supporting said contents, the parts being constructed and arranged whereby to maintain a substantially unobstructed central zone for the escape of vapors from the material under treatment, said container having, immediately above the said rotating means a horizontally expanded permanently opened passageway for the escaping of said vapors.

3. In an evaporating and drying device a tubular container having a substantially unobstructed outlet for the escape of vapors, rigid means internally of the container for positively communicating motion circumferentially thereof to the contents of the container, means on the interior wall of said container for supporting the contents, and means adjacent said unobstructed outlet for accelerating the escape of vapors and gases through the outlet.

4. In an evaporating and drying device, the combination of an externally heated substantially cylindrical container having a substantially unobstructed open end for the free escape of vapors and gases, rigid means adapted to the conformity of the interior surface of the container for communicating motion circumferentially thereof to the contents of the container, said parts being constructed and arranged whereby to maintain a substantially unobstructed central zone in communication with said open end, and for receiving the vapors and gases from the material whereby the same may be rapidly discharged through said open end, and spaced fixed supporting members adjacent to the interior wall of the container for supporting the contents, substantially as and for the purpose described.

5. In an evaporating and drying device, in combination, a container, means for applying heat externally thereto, rapidly and horizontally rotating means internally thereof for positively communicating centrifugal and circumferential motion to the contents thereof in thin layer formation and maintaining a quiet central zone means for withdrawing the gases and vapor of evaporation from said zone and means for supporting the contents adjacent to the interior wall of the container.

6. In an evaporating and drying device, in combination, an upright container open at the top, means for applying heat externally thereto, means internally thereof rotatable at a high speed for communicating motion circumferentially of the container to the contents thereof in layer formation and a plurality of fan blades externally of the container and adjacent to the top thereof adapted to withdraw the gases and vapor of evaporation from the space within said layer of material, means for driving said fan blades and means for supporting the contents of the container adjacent to the interior wall thereof.

7. In an evaporating and drying device, in combination, a heated cylindrical container, a plurality of rigid arms centrally mounted within said container and conformed to the shape of the longitudinal cross-section thereof, a plurality of fan blades centrally of the upper rim thereof, means for imparting a rapid rotary motion to said arms and said fan blades and spaced apart means adjacent to the interior walls thereof for supporting the contents of said container.

8. In an open evaporating and drying device, in combination, a heated cylindrical container, a plurality of arms mounted within said container parallel to the axis thereof, a succession of annular steps formed with the internal wall of said container, means for imparting a rapid rotary motion to said arms, said container having an outlet for the vapor of evaporation and means independent of the arms for withdrawing the vapor of evaporation said container having a horizontally widely expanded outlet for the vapor of evaporation through said outlet.

9. In an open evaporating and drying device, in combination, a heated container, a support transversely of the top thereof, a shaft axially mounted in said support, a plurality of blades conformed to the cross-sectional shape of said container mounted on said shaft, a conducting pipe centrally of the bottom of the container, a plurality of fan blades mounted on the shaft externally of the container adapted to drive the vapor of evaporation upwardly or downwardly, and means for imparting rotary motion to said shaft and said fan blades, and a succession of circular flanges formed with the internal wall of the container for supporting the contents thereof adjacent to the interior wall thereof.

10. In an evaporating apparatus of the character described, the combination of an upright container having a cylindrical wall, and a curved bottom, a surrounding jacket for steam or the like, a vertically disposed shaft, a plurality of blades curved in substantial accordance with the curvature of the internal wall of the container, horizontally disposed ring-shaped supports mounted upon the wall of the container, said container being open at its top, a fan mounted upon said shaft adjacent the open top of the container, and means for rotating said shaft.

11. In an evaporating apparatus, the combination of a container having a substantially cylindrical wall with an opening at one end, means for heating said wall, a plurality of conveyor means within the conveyor extending longitudinally of said wall, a rotatable shaft for said conveyor means, and a plurality of circumferentially extending projections interposed between said conveyor members and the circumferential wall of the container forming places of deposit for the material under treatment, and a fan member fixed to said shaft adjacent said opening in the container.

12. In an evaporating apparatus, the combination of a substantially vertically disposed container having a substantially cylindrical wall, with a closed curved lower end having a valve-controlled outlet, and an open upper end, means for heating the vertical wall of the container, a plurality of conveyor means within the container extending longitudinally of said wall, a rotatable shaft for said conveyor means, a plurality of circumferentially extending projections on the inner face of the side wall of the container, and a fan member fixed to the shaft at a point adjacent the open end of the container for withdrawing vapors from within the container.

13. In an evaporating apparatus, the combination of a vertically disposed container having a curved interior treating surface, said container having a surrounding heat jacket, means for introducing steam to said jacket whereby to impart to the said treating surface a temperature sufficient to evaporate liquid constituents of the material under treatment, said container having a horizontally widely expanded vapor outlet at its top for the copious discharge of vapors from the container, conveyor members extending longitudinally of and adjacent to said treating surface, means for supporting said conveyor members whereby to leave a substantially unobstructed interior zone for vapors, means for rapidly rotating said conveyor members whereby to cause the material under centrifugal force to move circumferentially and lengthwise of the treating surface in the form of a layer, and means operatively associated with the copious discharge opening for rapidly exhausting the vapors from said interior zone.

In testimony whereof, I have hereunto subscribed my name in the presence of two subscribing witnesses, this 24th day of November, 1913.

CHARLES R. MABEE.

Witnesses:
H. O. MARTIN,
C. A. DAVIS.